United States Patent
Beck

(10) Patent No.: US 12,498,438 B2
(45) Date of Patent: Dec. 16, 2025

(54) MR MAMMOGRAPHY

(71) Applicant: KONINKLIJKE PHILIPS N.V., Eindhoven (NL)

(72) Inventor: Gabrielle Beck, Venlo (NL)

(73) Assignee: Koninklijke Philips N.V., Eindhoven (NL)

( * ) Notice: Subject to any disclaimer, the term of this patent is extended or adjusted under 35 U.S.C. 154(b) by 212 days.

(21) Appl. No.: 18/271,482

(22) PCT Filed: Jan. 12, 2022

(86) PCT No.: PCT/EP2022/050504
§ 371 (c)(1),
(2) Date: Jul. 10, 2023

(87) PCT Pub. No.: WO2022/152730
PCT Pub. Date: Jul. 21, 2022

(65) Prior Publication Data
US 2024/0069136 A1 Feb. 29, 2024

(30) Foreign Application Priority Data
Jan. 14, 2021 (EP) .................. 21151590

(51) Int. Cl.
*G01V 3/00* (2006.01)
*A61B 5/00* (2006.01)
(Continued)

(52) U.S. Cl.
CPC .......... *G01R 33/5608* (2013.01); *A61B 5/004* (2013.01); *A61B 5/4312* (2013.01);
(Continued)

(58) Field of Classification Search
CPC .............. G01R 33/5608; G01R 33/385; G01R 33/4824; G01R 33/4828; G01R 33/50; G01R 33/561; A61B 5/4312; A61B 5/004
(Continued)

(56) References Cited

U.S. PATENT DOCUMENTS

2005/0017717 A1   1/2005  Duerk et al.
2013/0089271 A1   4/2013  Boernert et al.
(Continued)

FOREIGN PATENT DOCUMENTS

| CN | 102656608 A | * | 9/2012 | ........... G06T 11/006 |
| EP | 3531154 A1 | * | 8/2019 | ........... G01R 33/243 |
| WO | WO-2019041123 A1 | * | 3/2019 | ............. A61B 5/055 |

OTHER PUBLICATIONS

Winkelmann et al "Simultaneous Imaging and R2 Mapping Using a radial Multi-Gradient Echo . . . " Journal of Magnetic Resonance Imaging, 24: p. 939-944 2006.

Khouli et al "Detection of Breast Micro-Calcifications with MRI at 3T" Proceedings of the International Soc. for Magnetic Resonance in Med. p. 2489 (2010).

Song et al "k-Space weighted image contrast (KWIC) for contrast manipulation in projection reconstruction MRI" Magn. Reson. Med 44 p. 825-832 (2000).

(Continued)

*Primary Examiner* — Walter L Lindsay, Jr.
*Assistant Examiner* — Frederick Wenderoth

(57) ABSTRACT

The invention relates to a method of MR imaging of an object, namely of at least a part of the female breast. The method of the invention comprises the steps of: a) subjecting the object (10) to an imaging sequence comprising RF excitation pulses and switched magnetic field gradients, wherein multiple echo signals are generated at different echo times (TE1, TE2, TE3) after each RF excitation pulse, b) acquiring the echo signals along a set of radial or spiral k-space trajectories covering a given k-space region, wherein each of the echo signals generated after an RF excitation pulse is assigned a different orientation of the radial or spiral trajectory in k-space; c) reconstructing a single echo image for each echo time (TE1, TE2, TE3) from the echo signals acquired; d) deriving high-resolution water, (Continued)

fat, $B_0$ and/or apparent transverse relaxation time ($T_2^*$) maps from the single echo images using a deep learning algorithm; and d) synthesizing a high-resolution mammogram from the water, fat, $B_0$ and/or $T_2^*$ maps. Moreover, the invention relates to an MR device (1) and to a computer program for an MR device (1).

19 Claims, 2 Drawing Sheets

(51) Int. Cl.
*G01R 33/385* (2006.01)
*G01R 33/48* (2006.01)
*G01R 33/50* (2006.01)
*G01R 33/56* (2006.01)
*G01R 33/561* (2006.01)

(52) U.S. Cl.
CPC ....... *G01R 33/385* (2013.01); *G01R 33/4824* (2013.01); *G01R 33/4828* (2013.01); *G01R 33/50* (2013.01); *G01R 33/561* (2013.01)

(58) Field of Classification Search
USPC .......................................... 324/309
See application file for complete search history.

(56) References Cited

U.S. PATENT DOCUMENTS

| | | | | |
|---|---|---|---|---|
| 2014/0077813 | A1* | 3/2014 | Holmes | G01R 33/4824 324/322 |
| 2017/0322274 | A1 | 11/2017 | Bolster, Jr. et al. | |

OTHER PUBLICATIONS

Moran et al "High Resolution 3D Radial bSSFP with Ideal" Magnetic Resonance in Med. Vol. 71, No. 1, Mar. 15, 2013 p. 95-104.

Eggers et al "Spiral Water Fat Imaging with Integrated Off-Resonance Correction on Clinical Scanner" Proc. of the International Soc. for Magnetic Reson. in Med., May 7, 2011 p. 752.

Jimenez et al "High Performance Volumetric 3T Breast Acquisition: A Foundation for Multi-Parametric Imaging" Proc. of the Int. Soc. for Magnetic Resonance in Med. no. 3263, Apr. 22, 2016.

Su et al "UTE-m Dixon Based Thorax Synthetic CT Generation" Med. Phys. 46 (8) Aug. 2019.

Qian "Transforming UTE-mDixon MR Abdomen-Pelvis Images Into CT by Jointly Leveraging Prior Knowledge and Partial Supervision" IEEE/ACM Trans Comput Biol Bioinform. Jan.-Feb. 2021;18(1):70-82. doi: 10.1109/TCBB.2020.2979841. Epub Feb. 3, 2021. PMID: 32175868; PMCID: PMC7932030.

International Search Report and Written Opinion from PCT/EP2022/050504 mailed Mar. 24, 2022.

Schar et al "Dixon Water-Fat Separation in Propeller MRI Acquired with Two Interleaved Echoes" Magnetic Resonance in Med. 75 p. 718-728 (2016).

Ding et al "Reproducible automated breast density measure with no ionizing radiation using fat-water decomposition MRI" J Magn Reson Imaging. Oct. 2018 ; 48(4): 971-981. doi:10.1002/jmri.26041.

Chaudhari et al "Super-Resolution Musculoskeletal MRI Using Deep Learning" Magn Reson Med. Nov. 2018 ; 80 (5): 2139-2154. doi:10.1002/mrm.27178.

Jang et al "Fat suppression for ultrashort echo time imaging using a single-point Dixon method" NMR in Biomedicine 32(5) 2019.

* cited by examiner

MR MAMMOGRAPHY

CROSS REFERENCE TO RELATED APPLICATIONS

This application is a U.S. national phase application of International Application No. PCT/EP2022/050504 filed on Jan. 12, 2022, which claims the benefit of EP application Ser. No. 21/151,590.3 filed on Jan. 14, 2021 and is incorporated herein by reference.

FIELD OF THE INVENTION

The invention relates to the field of magnetic resonance (MR) imaging. It concerns a method of MR imaging of an object placed in the examination volume of an MR device. The invention also relates to an MR device and to a computer program to be run on an MR device.

BACKGROUND OF THE INVENTION

Image-forming MR methods which utilize the interaction between magnetic fields and nuclear spins in order to form two-dimensional or three-dimensional images are widely used nowadays, notably in the field of medical diagnostics, because for the imaging of soft tissue they are superior to other imaging methods in many respects, do not require ionizing radiation and are usually not invasive.

According to the MR method in general, the body of the patient to be examined is arranged in a strong, uniform magnetic field $B_0$ whose direction at the same time defines an axis (normally the z-axis) of the co-ordinate system to which the measurement is related. The magnetic field $B_0$ produces different energy levels for the individual nuclear spins in dependence on the magnetic field strength which can be excited (spin resonance) by application of an electromagnetic alternating field (RF field) of defined frequency (so-called Larmor frequency, or MR frequency). From a macroscopic point of view the distribution of the individual nuclear spins produces an overall magnetization which can be deflected out of the state of equilibrium by application of an electromagnetic pulse of appropriate frequency (RF pulse) while the corresponding magnetic field $B_1$ of this RF pulse extends perpendicular to the z-axis, so that the magnetization performs a precessional motion about the z-axis. The precessional motion describes a surface of a cone whose angle of aperture is referred to as flip angle. The magnitude of the flip angle is dependent on the strength and the duration of the applied electromagnetic pulse. In the case of a so-called 90° pulse, the magnetization is deflected from the z axis to the transverse plane (flip angle 90°).

After termination of the RF pulse, the magnetization relaxes back to the original state of equilibrium, in which the magnetization in the z direction is built up again with a first time constant $T_1$ (spin lattice or longitudinal relaxation time), and the magnetization in the direction perpendicular to the z direction relaxes with a second and shorter time constant $T_2$ (spin-spin or transverse relaxation time). The transverse magnetization and its variation can be detected by means of receiving RF coils which are arranged and oriented within an examination volume of the MR device in such a manner that the variation of the magnetization is measured in the direction perpendicular to the z-axis.

In order to realize spatial resolution in the body, time-varying magnetic field gradients extending along the three main axes are superposed on the uniform magnetic field $B_0$, leading to a linear spatial dependency of the spin resonance frequency. The signal picked up in the receiving coils then contains components of different frequencies which can be associated with different locations in the body. The signal data obtained via the receiving coils correspond to the spatial frequency domain and are called k-space data. The k-space data usually include multiple lines acquired with different phase encoding. Each line is digitized by collecting a number of samples. A set of k-space data is converted to an MR image by means of Fourier transformation.

Breast cancer is one of the most common cancers in women. Recent research has found that MR imaging can locate small breast lesions sometimes missed by mammography. MR imaging can also help to detect breast cancer in women with breast implants and in younger women who tend to have dense breast tissue. Conventional (X-ray based) mammography may not be as effective in these cases. Since MR imaging does not use ionizing radiation, it may be used to screen women in particular at the age of 40 or younger and to increase the number of screenings per year for women at high risk for breast cancer.

Although it has distinct advantages over conventional mammography, breast MR imaging also has potential limitations. For example, it is not always able to distinguish between healthy tissue and cancerous abnormalities, which may lead to unnecessary breast biopsies. This is often referred to as a "false positive" test results. Another disadvantage of breast MR imaging is that it has historically been unable to identify tiny calcium deposits (micro calcifications) that can indicate breast cancer.

For reasons of the higher resolution and the typically higher specificity conventional mammography is still the number one breast screening tool, despite the high sensitivity of MR imaging and particularly convincing results in dense breast tissue.

WINKELMANN et al. (JOURNAL OF MAGNETIC RESONANCE IMAGING, 24:939-944, 2006) describe a simultaneous MR imaging and $T_2^*$ mapping technique using a radial multi-gradient-echo sequence. A number of undersampled images is reconstructed, each for a different echo time. These images are simultaneously used to compute a high-resolution image and a $T_2^*$ map.

KHOULI eT al. (PROCEEDINGS OF THE INTERNATIONAL SOCIETY FOR MAGNETIC RESONANCE IN MEDICINE, $18^{TH}$ ANNUAL MEETING, p. 2489, 2010) describe a method for detection of breast microcalcifications by MR imaging at 3 Tesla. A 3D SPGRE ultra-short echo time sequence with radial reconstruction is used in combination with susceptibility weighted imaging.

EP 3 531 154 A1 discloses a method of MR imaging, in which a water/fat separation as well as $B_0$- and $T_2^*$-mapping is performed using multi-gradient-echo sequence with radial or spiral acquisition. An image of specified contrast is synthesized from the acquired echo signal data, the $B_0$ map and/or the $T_2^*$ map.

SUMMARY OF THE INVENTION

From the foregoing it is readily appreciated that there is a need for an improved method of MR-based mammography.

In accordance with the invention, a method of MR imaging of an object positioned in the examination volume of an MR device is disclosed. The method comprises the steps of:
 a) subjecting the object to an imaging sequence comprising RF excitation pulses and switched magnetic field gradients, wherein multiple echo signals are generated at different echo times after each RF excitation pulse, b) acquiring the echo signals along a set of radial or spiral k-space trajectories covering a given k-space region, wherein each of the echo signals generated after an RF excitation pulse is assigned a different orientation of the radial or spiral trajectory in k-space;

c) reconstructing a single echo image for each echo time from the echo signals acquired;

d) deriving high-resolution water, fat, $B_0$ and/or apparent transverse relaxation time ($T_2^*$) maps from the single echo images using a deep learning algorithm; and d) synthesizing a high-resolution mammogram from the water, fat, $B_0$ and/or $T_2^*$ maps, wherein a high-resolution intermediate image is reconstructed from a combination of the echo signals acquired at the different echo times (TE1, TE2, TE3) from the entire k-space region covered by the set of radial or spiral k-space trajectories, wherein the deriving of the high-resolution water, fat, $B_0$ and/or $T_2^*$ maps is additionally based on the high-resolution intermediate image.

According to the invention, multiple echo signals are acquired at different echo times. The echo signals are acquired along radial or spiral k-space trajectories (including known acquisition schemes like KOOSH-ball, Archimedean spiral, spiral phyllotaxis etc.). Radial or spiral k-space trajectories are preferred over conventional Cartesian k-space trajectories for their intrinsic motion robustness. Using radial or spiral k-space sampling, the center of k-space is oversampled and continuously updated. This redundancy can advantageously be exploited to detect and correct for motion, $B_0$ and $T_2^*$ effects.

Each of the echo signals generated after an RF excitation pulse is assigned a different orientation of the radial or spiral trajectory in k-space. This means that an "echo time distributed" sampling of k-space is performed. A given radial or spiral k-space trajectory is uniquely associated with a specific echo time. Multiple acquisitions of the same radial or spiral k-space trajectories with different echo times should be avoided to achieve a very high acquisition speed.

Single echo images are reconstructed for each echo time from the echo signals acquired from the covered k-space region. A k-space weighted image contrast (KWIC) filter can advantageously be used for reconstructing the single echo images (see Song et al., Magn. Reson. Med., 44, 825-832, 2000). For example, each of the single echo images can be reconstructed from the undersampled k-space data attributed to the respective echo time. The acquired echo signals attributed to a particular echo time will generally be undersampled, at least in the periphery of k-space. Hence, compressed sensing (CS) may advantageously be used for reconstruction of the single echo images from the undersampled signal data. The (KWIC-filtered) echo signals attributed to a particular echo time are distributed irregularly in k-space. The theory of CS is known to have a great potential for significant signal data reduction. In CS theory, a signal data set which has a sparse representation in a transform domain can be recovered from undersampled measurements by application of a suitable regularization algorithm. As a mathematical framework for signal sampling and reconstruction, CS prescribes the conditions under which a signal data set can be reconstructed exactly or at least with high image quality even in cases in which the k-space sampling density is far below the Nyquist criterion, and it also provides the methods for such reconstruction.

In addition, a single high-resolution intermediate image is reconstructed from the entirety of the echo signals, i.e. including all echo signals acquired for the different echo times, and from the entire k-space region covered by the set of radial or spiral k-space trajectories.

As a next step, a high-resolution water and/or fat and/or $B_0$ and/or apparent transverse relaxation time ($T_2^*$) map are derived from the single echo images using a deep learning algorithm. The computation of "super-resolution" MR images from lower resolution images using deep learning schemes is known as such in the art. Using appropriate training data comprising single-echo images as input and associated high-resolution (super-resolution) water, fat, $B_0$ and $T_2^*$ maps as output of the artificial neural network, a Dixon super-resolution deep learning reconstruction algorithm is implemented according to the invention. In order to improve the quality of the high-resolution water, fat, $B_0$ and $T_2^*$ maps, the deep learning-based reconstruction is additionally based on the high-resolution intermediate image reconstructed from the combination of the echo signals acquired for all different echo times, as described above.

A high-resolution tissue classification map and/or a calcification map can be derived from the water, fat, $B_0$ and/or $T_2^*$ maps. Moreover, further maps may be derived such as, e.g., a fat classification map, a fat fraction map etc. $T_2^*$ results principally from inhomogeneities in the main magnetic field $B_0$. These inhomogeneities are the result of intrinsic inhomogeneities in the main magnetic field itself and of susceptibility-induced field distortions produced by the tissue. The high-resolution $T_2^*$ map (ideally in combination with the water, fat and $B_0$ maps) derived from the single echo mages can consequently be used according to the invention to derive a (high-resolution) tissue classification map. In particular micro calcifications that may be associated with carcinoma in breast tissue cause characteristic susceptibility-induced field distortions in the local environment. This is exploited by the invention by using specifically the $T_2^*$ map to derive a high-resolution calcification map which is of particularly high diagnostic value. In combination with the super-resolution Dixon deep learning reconstruction, micro calcifications of less than 1 mm diameter can be identified.

Finally, a high-resolution mammogram is synthesized from the water, fat, $B_0$ and/or $T_2^*$ maps. The synthesized mammogram is computed by assigning a Hounsfield unit value to each pixel or voxel. A Hounsfield unit value assigned to each image position provides the X-ray radiation attenuation property of the tissue enabling the computation of the actual mammogram with exactly the same contrast characteristics to which the radiologist is accustomed in the field of conventional mammography screening. The assignment of Hounsfield units to image positions is performed on the basis of the high-resolution water, fat, $B_0$ and/or $T_2^*$ maps. It is known as such in the art that Dixon imaging providing water/fat separation is known to be effective for the purpose of generating synthetic X-ray images. Any additional contrast information of the same region is useful to determine the Hounsfield units for each image position correctly. Hence, the synthesis of the mammogram is ideally also based on the derived tissue classification and/or calcification maps.

To obtain a uniform k-space distribution of the echo signals, the rotation angle of the radial or spiral k-space trajectories (positioned in the $k_x$-/$k_y$-plane) can be incremented during the acquisition by the golden angle, which corresponds to 180° multiplied by the golden ratio. To avoid large gradient increments, a tiny golden angle increment may be preferred. Another possibility is to acquire echo signals along the radial or spiral k-space trajectories in a successive order in k-space. This has the advantage that system induced phase errors from even and odd echo samplings is corrected for. A further option is to distribute the k-space trajectories of the individual echoes in the $k_z$-direction (i.e., in the direction perpendicular to the plane in which the radial or spiral k-space trajectories are rotated) by incrementing in the $k_z$-direction during the acquisition. The uniform distribution (in contrast to the distribution on a regular grid in k-space) supports the derivation of the high-resolution water, fat, $B_0$ and/or apparent transverse relaxation time ($T_2^*$) maps from the single echo images using the deep learning algorithm. To further support the Deep Learning-based derivation of the high-resolution maps a varying shift of the echoes along the radial or spiral k-space trajectories may be applied. Furthermore, the acquisition bandwidth (i.e. the temporal duration and/or sampling frequency of the respective echo acquisition) may varied between different shots of the imaging sequence and/or between the acquisitions of different echo signals.

In a preferred embodiment, the first echo signal after each RF excitation is generated at an ultra-short echo time (UTE) to extend the range of accessible echo time values. Known partial echo techniques may be applied for this purpose as well. Echo shifting may alternatively or additionally be employed to improve the echo time coverage and to optimize the $T_2^*$ mapping. The ultra-short echo time is particularly well-suited for identifying calcifications characterized by a very short apparent transverse relaxation time. Improved fitting and $T_2^*$ mapping is the consequence. A 3D radial k-space acquisition scheme ("KOOSH-ball") may be employed for sampling the given k-space region in combination with the UTE technique. Due to MR hardware limitations (transmit/receive switching dead time) each center-out radial k-space trajectory sampled at an ultra-short echo time will have a gap in the center of k-space. To fill these gaps the known PETRA scheme may be employed. The PETRA scheme fills the gaps by a separate (Cartesian) sampling of the central k-space region.

In a further preferred embodiment, motion of the object occurring during the acquisition is derived from at least one of the echo signals. This can be used to correct for the detected motion in the step of reconstructing the single echo images. For example, one or more of the echo signals representing radial or spiral k-space samples can be used as intrinsic navigators for the detection of motion or breathing states. This can advantageously be combined with the method of the invention to reduce motion-induced artefacts. In particular, the detected motion (for example a detected displacement of the imaged object) is attributed to one of a number of discrete motion states which the examined patient or the examined body portion undergoes, e.g., during breathing. A $B_0$ map can then be derived for each motion state from the echo signals assigned to the respective motion state. In this way, incorporating intrinsic motion and motion induced $B_0$ determination and correction enables a more accurate $T_2^*$ mapping. The accuracy of the tissue mapping in breast imaging can be significantly improved by addressing motion induced $B_0$ variations. In particular, breathing induced $B_0$ variations have a significant impact on breast tissue mapping. The intermediate information resulting from motion and motion induced $B_0$ detection can be provided to the deep learning algorithm to determine accurate tissue classification maps. The thus improved fitting allows this technique to be also combined with susceptibility weighted imaging strategies (SWI) allowing to determine e. g. more accurate phase images.

As a result, the invention provides a high-resolution MR calcification mammography and tissue characterization detection technique. The tissue characterization provides additional information to the calcification map. From the same acquisition, tissue oxygenation levels, fat classification by e. g. fat fraction can be provided within the same scan. It provides tumor relevant diagnostic and treatment information well-suited for breast screening and for non-contrast enhanced breast MR imaging in general.

The method of the invention described thus far can be carried out by means of an MR device including at least one main magnet coil for generating a uniform, steady magnetic field $B_0$ within an examination volume, a number of gradient coils for generating switched magnetic field gradients in different spatial directions within the examination volume, at least one body RF coil for generating RF pulses within the examination volume and/or for receiving MR signals from a body of a patient positioned in the examination volume, a control unit for controlling the temporal succession of RF pulses and switched magnetic field gradients, and a reconstruction unit for reconstructing MR images from the received MR signals. The method of the invention can be implemented by a corresponding programming of the reconstruction unit and/or the control unit of the MR device.

The method of the invention can be advantageously carried out on most MR devices in clinical use at present. To this end it is merely necessary to utilize a computer program by which the MR device is controlled such that it performs the above-explained method steps of the invention. The computer program may be present either on a data carrier or be present in a data network so as to be downloaded for installation in the control unit of the MR device.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF THE EMBODIMENTS

Figure 1:
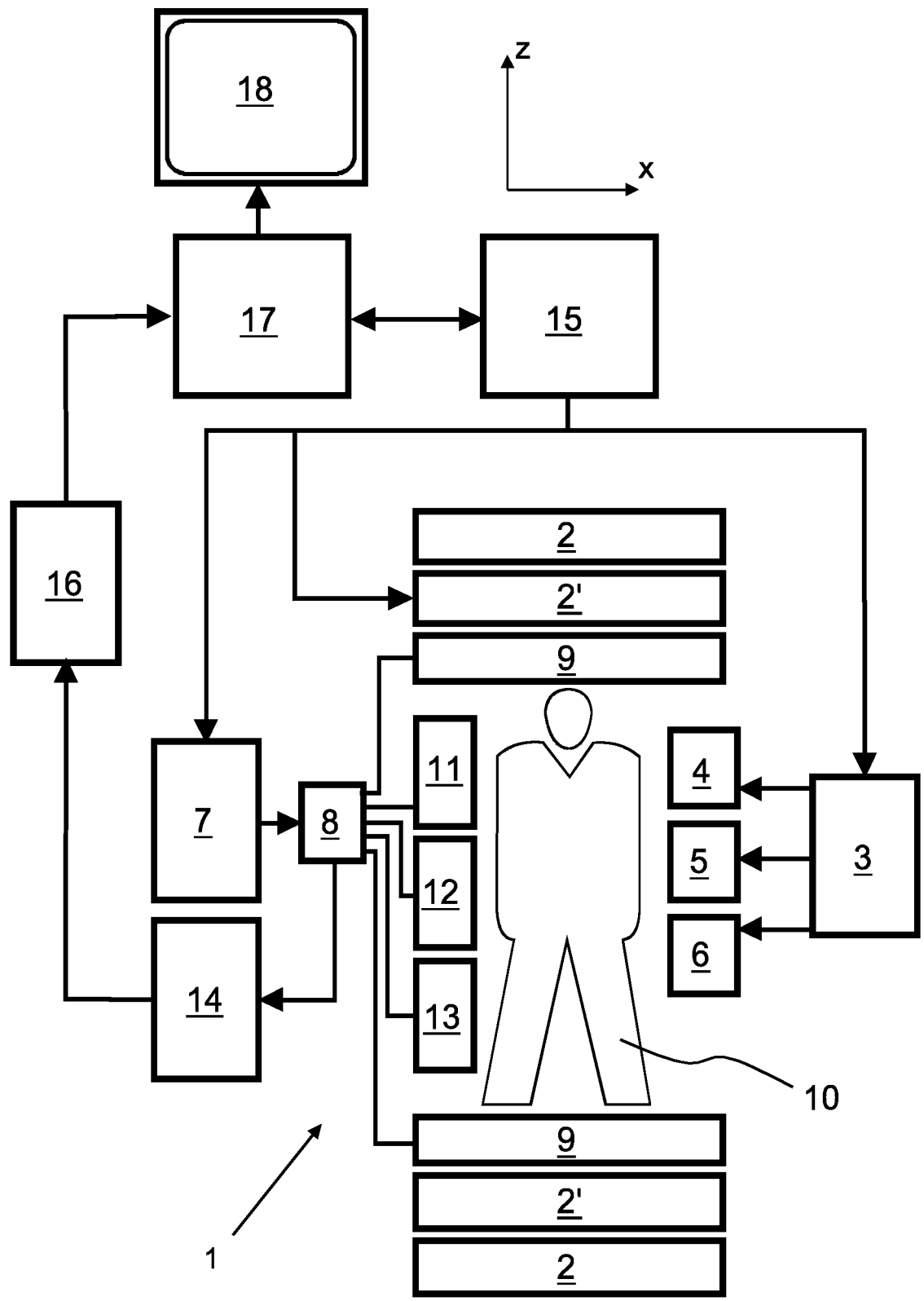
FIG. 1 shows an MR device for carrying out the method of the invention.

With reference to FIG. 1, an MR device 1 is shown as a block diagram. The device comprises superconducting or resistive main magnet coils 2 such that a substantially uniform, temporally constant main magnetic field $B_0$ is created along a z-axis through an examination volume. The device further comprises a set of ($1^{st}$, $2^{nd}$ and—where applicable—$3^{rd}$ order) shimming coils 2', wherein the current flow through the individual shimming coils of the set 2' is controllable for the purpose of minimizing $B_0$ deviations within the examination volume.

A magnetic resonance generation and manipulation system applies a series of RF pulses and switched magnetic field gradients to invert or excite nuclear magnetic spins, induce magnetic resonance, refocus magnetic resonance, manipulate magnetic resonance, spatially and otherwise encode the magnetic resonance, saturate spins, and the like to perform MR imaging.

More specifically, a gradient amplifier 3 applies current pulses or waveforms to selected ones of whole-body gradient coils 4, 5 and 6 along x, y and z-axes of the examination volume. A digital RF frequency transmitter 7 transmits RF pulses or pulse packets, via a send/receive switch 8, to a body RF coil 9 to transmit RF pulses into the examination volume. A typical MR imaging sequence is composed of a packet of RF pulse segments of short duration which, together with any applied magnetic field gradients, achieve a selected manipulation of nuclear magnetic resonance signals. The RF pulses are used to saturate resonance, excite resonance, invert magnetization, refocus resonance, or manipulate resonance and select a portion of a body 10 positioned in the examination volume. The MR signals are also picked up by the body RF coil 9.

For generation of MR images of limited regions of the body 10 or for scan acceleration by means of parallel imaging, a set of local array RF coils 11, 12, 13 are placed contiguous to the region selected for imaging. The array coils 11, 12, 13 can be used to receive MR signals induced by body coil RF transmissions.

The resultant MR signals are picked up by the body RF coil 9 and/or by the array RF coils 11, 12, 13 and demodulated by a receiver 14 preferably including a preamplifier (not shown). The receiver 14 is connected to the RF coils 9, 11, 12 and 13 via the send/receive switch 8.

A host computer 15 controls the shimming coils 2' as well as the gradient pulse amplifier 3 and the transmitter 7 to generate any of a plurality of MR imaging sequences, such as echo planar imaging (EPI), echo volume imaging, gradient and spin echo imaging, fast spin echo imaging, and the like. For the selected sequence, the receiver 14 receives a single or a plurality of MR signals in rapid succession following each RF excitation pulse. A data acquisition system 16 performs analog-to-digital conversion of the received signals and converts each MR data sample to a digital format suitable for further processing. In modern MR devices the data acquisition system 16 is a separate computer which is specialized in acquisition of raw image data.

Ultimately, the digital raw image data are reconstructed into an image representation by a reconstruction processor 17 which applies a Fourier transform or other appropriate reconstruction algorithms. The MR image may represent a planar slice through the patient, an array of parallel planar slices, a three-dimensional volume, or the like. The image is then stored in an image memory where it may be accessed for converting slices, projections, or other portions of the image representation into appropriate format for visualization, for example via a video monitor 18 which provides a man-readable display of the resultant MR image.

The host computer 15 is programmed to execute the method of the invention described herein above and in the following.

In an embodiment of the invention, an imaging sequence is applied comprising RF excitation pulses and switched magnetic field gradients in the read-out and phase-encoding directions x and y and in the slice-selection direction z. A plurality of sets of echo signals is acquired in multiple repetitions (shots) of the sequence using different gradient waveforms in the x-/y-directions and/or in the z-direction in order to completely cover the required region of k-space by a radial sampling pattern. The timing and amplitudes of the readout gradients in the x-/y-directions are chosen such that different echo times $TE_1$, $TE_2$, . . . , $TE_N$ are provided. Preferably, the imaging sequence is an UTE sequence such that the echo signal immediately following each RF excitation is generated at an ultra-short echo time.

Figure 2:
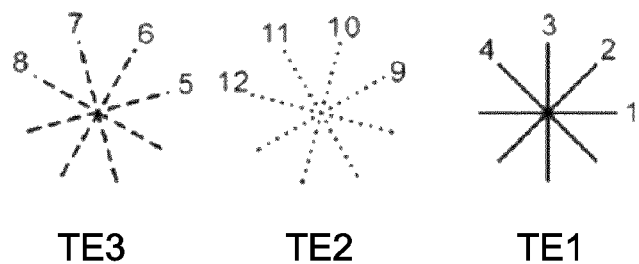
FIG. 2 shows a schematic (simplified) radial k-space sampling scheme according to an embodiment of the invention.
Figure 3:
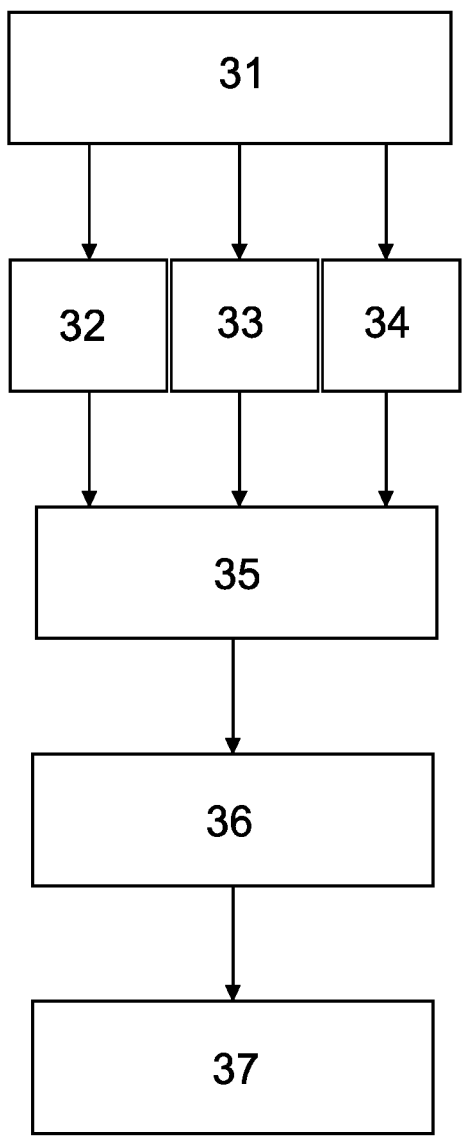
FIG. 3 illustrates the method of the invention as a flow diagram.

A basic UTE pulse sequence with its half excitation pulse and radial imaging from the center of k-space can be employed. Magnetic field gradients are switched in the z-direction for phase encoding so as to achieve a Cartesian k-space sampling pattern in this direction (according to the known "stack of stars" sampling scheme to enable the reconstruction of a 3D image). A shifted $k_z$ slice encoding sampling as used for super resolution imaging (see van Reeth et al., Concepts in Magnetic Resonance Part A, vol. 40A(6), 306-325, 2012) can advantageously be applied. Using radial k-space sampling, the center of k-space is oversampled. Multiple echo signals with variable echo times can be acquired by shifting or delaying the echo acquisitions and/or by successive multiple echo acquisitions. Reversed echo acquisitions may be applied. An "echo time distributed" sampling of k-space is performed. This means that the echo times are distributed in k-space with oversampling of the k-space center. This is illustrated in FIG. 2. FIG. 2 shows the orientations of radial k-space trajectories for radial imaging for three different echo times TE1, TE2 and TE3 in and four radial acquisitions per shot of the used UTE sequence. The acquisition sequence of the radial k-space trajectories is indicated by the numbers 1, 2, . . . 12. A very fast acquisition is achieved in this fashion with an optimal distribution of the acquired echo signal data in k-space. The acquisition of the echo signal data in the described fashion is performed in step 31 of the flow diagram in FIG. 3.

As a next step (step 32 in FIG. 3), single echo images are reconstructed for each echo time from the echo signals acquired from a central portion of the covered k-space region. A k-space weighted image contrast (KWIC) filter can be used for reconstructing the single echo images.

In addition, a single high-resolution intermediate image is reconstructed in step 33 from the entirety of the echo signals, i.e. including all echo signals acquired for the different echo times, and from the entire k-space region covered by the set of radial or spiral k-space trajectories.

In step 34, motion occurring during the acquisition is derived from at least one of the echo signals. One or more of the radial k-space samples can be used as intrinsic navigators for the detection of motion or breathing states. In particular, the detected motion is attributed to one of a number of discrete motion states. A low-resolution $B_0$ map is then derived for each motion state from the echo signals assigned to the respective motion state.

In step 35, a high-resolution water, fat, $B_0$ and $T_2^*$ map are derived from the single echo images (and the shifted $k_z$ slice encoding) using a deep learning algorithm. In order to improve the quality of the high-resolution water, fat, $B_0$ and $T_2^*$ maps, the deep learning-based reconstruction is also based on the high-resolution intermediate image reconstructed in step 33. Furthermore, the intermediate information resulting from motion and motion induced $B_0$ detection in step 34 is provided to the deep learning algorithm to determine accurate tissue classification maps. The accuracy of the $T_2^*$ mapping is significantly improved by addressing the motion induced $B_0$ variations.

A high-resolution tissue classification map and a calcification map are derived in step 36 from the water, fat, $B_0$ and/or $T_2^*$ maps.

Finally, a high-resolution mammogram is synthesized in step 37 from the water, fat, $B_0$ and/or $T_2$* maps. The synthesized mammogram is computed by assigning a Hounsfield unit value to each pixel or voxel and by computing the pixel or voxel intensity according to the resulting X-ray radiation attenuation. The assignment of Hounsfield units to image positions is performed on the basis of the high-resolution water, fat, $B_0$ and/or $T_2$* maps. The synthesis of the mammogram is also based on the derived tissue classification and/or calcification maps to determine the Hounsfield units for each image position correctly.

Further steps (not depicted) may optionally be included, such as post-processing steps for removing system imperfections (e.g. de-blurring) and/or the use of certainty maps for the deep learning reconstruction.

Figure 4:
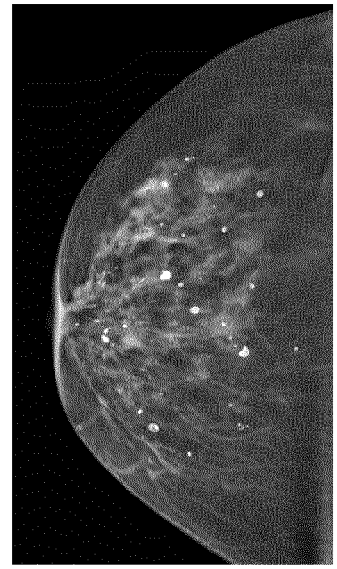
FIG. 4 shows an MR mammogram synthesized by the method of the invention.

Possible image outputs for the user are the high-resolution water, fat and $T_2$* maps resulting from the deep learning reconstruction and, in particular, the synthesized mammogram, as shown in FIG. 4. Also the derived tissue classification and calcification maps may be displayed to the user to support the diagnosis.

The invention claimed is:

1. A method of magnetic resonance (MR) imaging of an object positioned in an examination volume of an MR device, the method comprising the steps of:
   a) subjecting the object to an imaging sequence comprising RF excitation pulses and switched magnetic field gradients, wherein multiple echo signals are generated at different echo times (TE1, TE2, TE3) after each RF excitation pulse,
   b) acquiring the echo signals along a set of radial or spiral k-space trajectories covering a given k-space region, wherein each of the echo signals generated after an RF excitation pulse is assigned a different orientation of the radial or spiral trajectory in k-space;
   c) reconstructing a single echo image for each echo time (TE1, TE2, TE3) from the echo signals acquired;
   d) deriving high-resolution water, fat, $B_0$ and/or apparent transverse relaxation time ($T_2$*) maps from the single echo images using a deep learning algorithm; and
   e) synthesizing a high-resolution mammogram from the water, fat, $B_0$ and/or $T_2$* maps,
   wherein a high-resolution intermediate image is reconstructed from a combination of the echo signals acquired at the different echo times (TE1, TE2, TE3) from the entire k-space region covered by the set of radial or spiral k-space trajectories, wherein the deriving of at least one of the high-resolution water, fat, $B_0$, or $T_2$* maps is additionally based on the high-resolution intermediate image.

2. A magnetic resonance (MR) device including at least one main magnet coil for generating a uniform, steady magnetic field $B_0$ within an examination volume, a number of gradient coils for generating switched magnetic field gradients in different spatial directions within the examination volume, at least one RF coil for generating RF pulses within the examination volume and/or for receiving MR signals from an object positioned in the examination volume, a control unit for controlling the temporal succession of RF pulses and switched magnetic field gradients, and a reconstruction unit for reconstructing MR images from the received MR signals, wherein the MR device is arranged to perform the method of claim 1.

3. A method for obtaining high-resolution water, fat, B0 and/or T2* maps, comprising:
   receiving multiple echo signals that were generated at different echo times (TE1, TE2, TE3) after each RF excitation pulse of an imaging sequence performed on an object, wherein the echo signals were acquired along a set of radial or spiral k-space trajectories covering a given k-space region, wherein each of the echo signals generated after an RF excitation pulse is assigned a different orientation of the radial or spiral trajectory in k-space; reconstructing a single echo image for each echo time (TE1, TE2, TE3) from the echo signals acquired, wherein a high-resolution intermediate image is reconstructed from a combination of the echo signals acquired at the different echo times (TE1, TE2, TE3) from the entire k-space region covered by the set of radial or spiral k-space trajectories;
   deriving at least one of high-resolution water, fat, B0, or T2* maps is additionally based on the high-resolution intermediate image.

4. The method of claim 1, wherein a tissue classification map and/or a calcification map is derived from the at least one of the water, fat, $B_0$, or $T_2$* maps.

5. The method of claim 1, wherein a first echo signal after each RF excitation is generated at an ultra-short echo time (UTE).

6. The method of claim 1, wherein echo signals are acquired separately from one or more missing parts of the k-space region.

7. The method of claim 1, wherein further at least one of: the synthesizing of the high resolution mammogram and the derivation of the tissue classification map and/or the calcification map is additionally based on the high-resolution intermediate image.

8. The method of claim 1, wherein the set of radial or spiral k-space trajectories oversamples the central portion of k-space.

9. The method of claim 1, wherein a rotation angle of the radial or spiral k-space trajectories is incremented during acquisition such that a uniform k-space distributions of the echo signals is obtained.

10. The method of claim 1, wherein the k-space trajectories of the individual echoes are distributed in the $k_z$-direction.

11. The method of claim 1, wherein motion of the object occurring during the acquisition of the echo signals is derived from at least one of the echo signals and
   the detected motion is corrected for in the step of reconstructing the single echo images and/or
   the detected motion is attributed to one of a number of motion states, wherein a $B_0$ map is derived for each motion state from the echo signals assigned to the respective motion state.

12. The method of claim 1, wherein a k-space weighted image contrast (KWIC) filter is used for reconstructing the single echo images.

13. A computer program to be run on a magnetic resonance (MR) device, which computer program comprises instructions stored on a non-transitory computer readable medium for executing the method of claim 1.

14. The method of claim 3, wherein a tissue classification map and/or a calcification map is derived from the at least one of the water, fat, $B_0$, or $T_2$* maps.

15. The method of claim 3, wherein a first echo signal after each RF excitation is generated at an ultra-short echo time (UTE).

16. The method of claim 3, wherein echo signals are acquired separately from one or more missing parts of the k-space region.

17. The method of claim 3, wherein the set of radial or spiral k-space trajectories oversamples the central portion of k-space.

18. The method of claim 3, wherein a rotation angle of the radial or spiral k-space trajectories is incremented during acquisition such that a uniform k-space distributions of the echo signals is obtained.

19. The method of claim 11, wherein the deriving of the at least one high-resolution water, fat, $B_0$, or $T_2^*$ maps, the synthesizing of the high resolution mammogram, and/or the derivation of the tissue classification map and/or the calcification map is additionally based on the $B_0$ maps derived for the different motion states.

\* \* \* \* \*